(12) United States Patent
Henk

(10) Patent No.: US 12,409,525 B2
(45) Date of Patent: Sep. 9, 2025

(54) MACHINE TOOL

(71) Applicant: HEGENSCHEIDT-MFD GMBH, Erkelenz (DE)

(72) Inventor: Christian Henk, Erkelenz (DE)

(73) Assignee: Hegenscheidt-MFD GmbH, Erkelenz (DE)

( * ) Notice: Subject to any disclaimer, the term of this patent is extended or adjusted under 35 U.S.C. 154(b) by 610 days.

(21) Appl. No.: 17/783,372

(22) PCT Filed: Dec. 7, 2020

(86) PCT No.: PCT/EP2020/084795
§ 371 (c)(1),
(2) Date: Jun. 8, 2022

(87) PCT Pub. No.: WO2021/122078
PCT Pub. Date: Jun. 24, 2021

(65) Prior Publication Data
US 2023/0020237 A1    Jan. 19, 2023

(30) Foreign Application Priority Data
Dec. 16, 2019   (EP) .................................... 19216571

(51) Int. Cl.
*B23Q 17/22* (2006.01)
*B21D 43/00* (2006.01)
*B23Q 3/155* (2006.01)

(52) U.S. Cl.
CPC ........... *B23Q 17/22* (2013.01); *B21D 43/003* (2013.01); *B23B 2231/10* (2013.01);
(Continued)

(58) Field of Classification Search
CPC .... B23Q 17/22; B23Q 3/15546; B23Q 17/00; B23Q 17/2442; B21D 43/003;
(Continued)

(56) References Cited

U.S. PATENT DOCUMENTS

| 11,392,524 B2 * | 7/2022 | Friesen ............... G06F 13/4282 |
| 2010/0171276 A1 * | 7/2010 | Kaneko .............. B23Q 3/15546 |
| | | 279/142 |
| 2020/0073366 A1 * | 3/2020 | Herel .................... B66F 9/0655 |

FOREIGN PATENT DOCUMENTS

| CN | 104199424 A | 12/2014 |
| EP | 1339014 A1 | 8/2003 |

(Continued)

*Primary Examiner* — Davetta W Goins
*Assistant Examiner* — Sharmin Akhter
(74) *Attorney, Agent, or Firm* — Harness, Dickey & Pierce, P.L.C.

(57) ABSTRACT

In order to provide an operating method for a machine tool and to propose a system which enables the monitoring of the installation, position and the like of tools in a respective machine without the need for major construction work, the disclosure proposes a system for assigning tools mounted on rams to an installation position on a machine, which consists of a writable RFID chip with a transponder, memory and passive digital inputs positioned on the ram, and an electrically switchable contact panel positioned at a connection position of the machine, whereby the contacts of the contact panel can make contact with the digital inputs and the RFID chip transmits at least one identifier and the assignment of the digital inputs during a query process.

11 Claims, 5 Drawing Sheets

(52) U.S. Cl.
CPC .............. *B23Q 3/15546* (2013.01); *G05B 2219/49304* (2013.01); *G05B 2219/50338* (2013.01)

(58) Field of Classification Search
CPC ...... B23B 2231/10; G05B 2219/49304; G05B 2219/50338
See application file for complete search history.

(56) References Cited

FOREIGN PATENT DOCUMENTS

| | | |
|---|---|---|
| JP | 2003025176 A | 1/2003 |
| WO | WO-2018/087163 A1 | 5/2018 |

* cited by examiner

MACHINE TOOL

CROSS-REFERENCE TO RELATED APPLICATIONS

This application is a U.S. National Phase application under 35 U.S.C. 371 of International Application No. PCT/EP2020/084795 filed on Dec. 7, 2020, which claims the benefit of European Patent Application No. 19216571.0, filed on Dec. 16, 2019. The entire disclosures of the above applications are incorporated herein by reference.

FIELD

The present disclosure relates to a method of operating a system for allocating tools mounted on rams to an installation position in a machine tool and to the system itself.

BACKGROUND

This section provides background information related to the present disclosure which is not necessarily prior art.

Machine tools are equipped with different tools at different positions depending on the task that is required and the intended use of the machine tool. For the purposes of the disclosure, the term "tool" basically includes elements in contact with the workpiece, i.e. including handling components of a machine and the like. Tools and components are usually arranged on or include so-called rams.

Operators are fundamentally interested in knowing whether a tool is located at a particular installation position on the machine, and if so, whether it is the correct tool, in terms of type or its life cycle.

Usually, such machines are used for production or machining purposes, i.e. in an environment where heavy vibrations occur, contamination takes place, high temperatures may occur, many metallic objects and surfaces are present and, in addition, there is usually little or no installation space.

The JP 2003 025 176 A is a system for assigning tools mounted on rams to an installation position on a machine, in which a writable RFID chip arranged on a ram is provided with a transponder, memory and passive digital inputs.

SUMMARY

This section provides a general summary of the disclosure, and is not a comprehensive disclosure of its full scope or all of its features.

Based on the described state of the art, the present disclosure is based on the problem of providing an operating method for a machine tool and proposing a system which make it possible to carry out monitoring of the installation, position etc. of tools in a corresponding machine without the need for a great deal of construction work.

Furthermore, a method for operating a machine tool is proposed in which a corresponding system is implemented.

The disclosure also comprises a device enabling an arrangement on machine tools and rams, with which a corresponding allocation is possible.

In accordance with the disclosure, the solution comprises RFID technology. An RFID system generally comprises a transponder and a reading device. The transponder contains an identifying code. Current RFID transponders are writable and can store the desired information. Communication is achieved either by alternating magnetic fields generated by the reading device at short range or, at greater distances, by mostly high-frequency radio waves. This not only transmits the data, but also supplies the transponder with energy. This means that the passive transponder does not need a power supply.

The software in the reading device controls the reading process and transmits the information to an EDP system.

RFID chips are known to be equipped with so-called switching inputs. In the most simplest case, these are inputs that can be queried by the chip. An input can be wired or not, which results in at least two states per input.

The disclosure uses such RFID chips, which comprise a transponder, memory and corresponding switchable inputs.

According to the disclosure, a contact panel is constructed on the machine, which can be contacted with the inputs of the RFID chip. Contact can be made directly by bringing the RFID inputs into direct contact with the contact panels, or contact can be made through the use of adapters, wires and the like.

The contact panels on the machine can be switched so that the individual contacts of the contact panel can have different switching states or charge states. In accordance with an advantageous proposal of the disclosure, the contact panels are either not wired at all or are earthed.

By using, for example, four contact panels that can be identified by RFID chip-sensing switchable inputs, 16 different wiring states can be achieved. Since the wiring states are binary, they are usually $2^N$ different states. A contact panel contact can be unswitched or switched, either to a voltage or, for example, to earth (ground).

If the corresponding ram is equipped with the corresponding tool, the RFID chip can be uniquely assigned to the tool by the computer or EDP. This can be done via an identifier or by writing directly on the RFID chip. If required, this also provides information about the tool itself, i.e. its application functions, diagnostic results, component monitoring information etc.

If the ram is then placed at the corresponding position of a machine tool as intended, the contacts of the machine's contact panel will make contact with the digital inputs of the RFID chip. The wiring of the digital inputs can therefore be identified according to the wiring of the contact panel. When queried by the reading device, the RFID chip also transmits the respective wiring status of the digital inputs at the same time as the identifier or other information. This means that a unique installation position in the machine can be assigned.

By using the disclosure, it is therefore possible to determine without making contact whether a tool is mounted at the intended installation position of a machine tool, and if so, which tool.

Due to the use of RFID technology, this is done without the need for a power supply and with a minimum amount of cabling. For example, an earthing cable can be routed to a contact panel, which makes contact with certain contacts. Non-contacted contacts correspond to a 0, contacted contacts to a 1. With four contacts, for example, a 0001, 0010, 0100, 1000, etc. identifier can be generated by the wiring. If a ram with a corresponding tool and RFID chip is installed at a given position, the wiring can be determined for the digital inputs that come into contact with the contacts of the contact panel. If the wiring reads 0010, for example, it is clear that this is the installation position wired in this way, i.e. tool position 2.

According to an advantageous proposal, the disclosure would be implemented on a deep rolling machine. Whereas in conventional machine tools the tools, parts in contact with the workpiece, handling components, attachment points such as tool turrets, other standardised tool interfaces, individually designed interfaces and the like can in principle be designed in accordance with the disclosure, the environment surrounding a deep rolling machine, for example, is rather difficult.

Deep rolling machines are used to solidify crankshafts around the radii between the main bearing and pin bearing seats and on the crank webs. This is done using pincer-shaped tools, so-called deep rolling units, which are equipped with a deep rolling head and a support roller head. These tool heads are to be monitored with regard to type and position. Routing cables to every tool is not easy to implement and should always be avoided.

According to the disclosure, the tool heads are equipped with a passive RFID chip. The transponder chip is written with information about the specific tool. In addition, corresponding contact information or wiring information is recorded via the switchable digital inputs and transmitted during the readout. For example, on one type of deep rolling machine, fourteen tool positions per tool type are possible. Therefore, at least four contact panels or four transponder chip inputs are required. There are therefore up to twenty-eight tools in the machine at the same time. They are usually very close to each other, leaving little space for assemblies. The usually metallic environment is subject to vibrations and contamination. Temperatures of up to 80° C. can also occur.

The contact surface according to the disclosure is used for a circuit that can be assigned to the corresponding installation position.

This makes it possible to determine at any time, by simply reading the RFID chips, whether a particular installation position on the machine is occupied and, if so, with which tool or which ram. The EDP is then able to make further allocations.

The ram, which is a connecting structure to which the tool is attached, is the part of the machine tool that needs to be changed. This ram is equipped with the RFID chip. There is a tool holder on the machine into which the ram is inserted. The contact panel is built directly onto the tool holder.

The ram can be directly equipped with an RFID chip or have a contact panel that makes contact with the machine's contact panel and is then connected to the RFID chip via corresponding wires. This is called an adapter.

According to the disclosure, it is proposed that the contact panel has a base contact which is then connected in an electrically conductive manner to the other contacts in different ways or in different combinations. The RFID chip can now be wired via the base contact, which can then be "read out" from the other contacts of the contact panel via the electrical connections. This avoids the need for any cabling on the machine in order to connect the contact panel. The wiring is effectively provided by the RFID chip itself.

If a contact panel consists of four contacts, for example to provide 16 wiring options, a fifth contact element is required, the so-called base contact, which is then connected to the other four contact panels in different combinations. The disclosure proposes a system and an operating method that can be implemented with little effort, even in a difficult environment of a machine tool, and which allows the tools to be clearly assigned to the installation positions at all times.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and features of the disclosure are explained in the following description of the figures below. The following items are shown:

In the above figures, identical elements are provided with the same reference numbers.

Corresponding reference numerals indicate corresponding parts throughout the several views of the drawings.

DETAILED DESCRIPTION

Example embodiments will now be described more fully with reference to the accompanying drawings.

Figure 1:
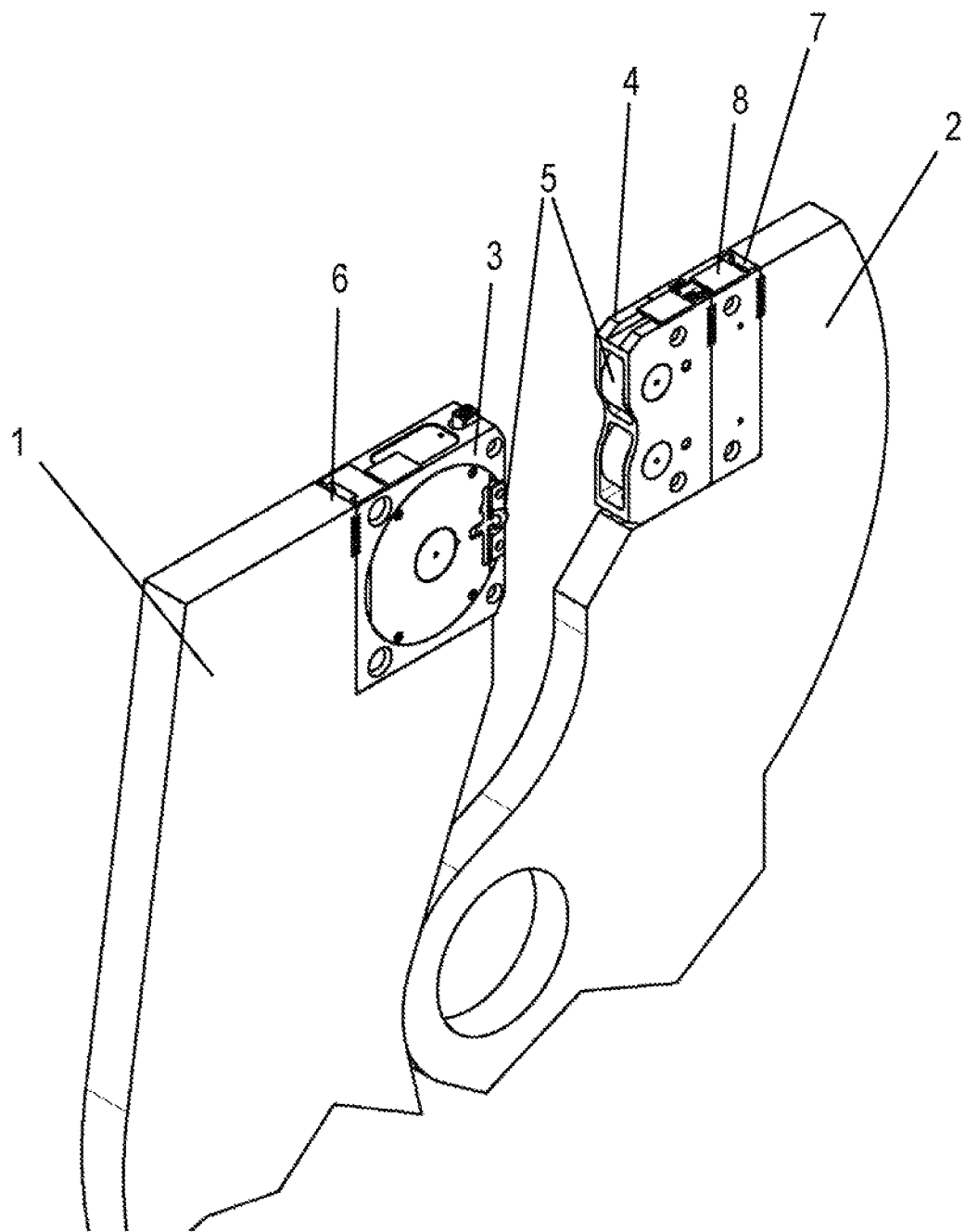
FIG. 1 shows a perspective view of a design example of the disclosure.
Figure 2:
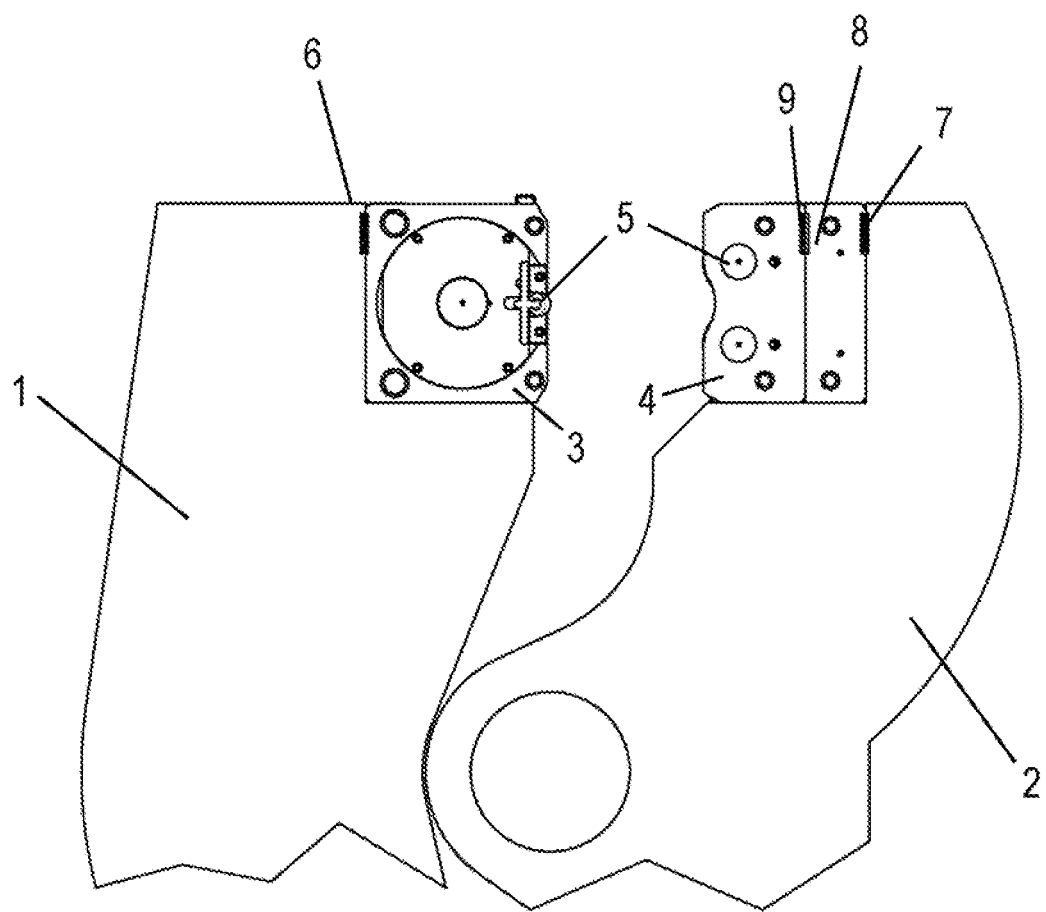
FIG. 2 shows a front view according to FIG. 1.

The FIGS. 1 and 2 show an example of an arrangement on a machine. In the illustrated design example, the tool holder 1 and the tool holder 2 of a machine are equipped with rams 3 and 4, which in turn carry the tools 5. In the illustrated design example, these are rollers for rolling.

Contact area 6 is arranged between the tool holder 1 and the ram 3, in which a contact panel is located on the tool holder side and an RFID chip with a corresponding contact panel is located on the ram. The same applies to the contact area 7 between the tool holder 2 and the ram 4.

In the illustrated design example, however, the tool holder 2 has a special feature in that a receptacle adapter 8 is arranged between the actual ram 4 and the tool holder 2. Adapter 8 is in contact with tool holder 2 via the contact panel 7, and adapter 8 in turn is in contact with the actual ram 4 via the contact area 9, with the RFID chip and the contact panel on the machine located in contact area 8.

Figure 3:
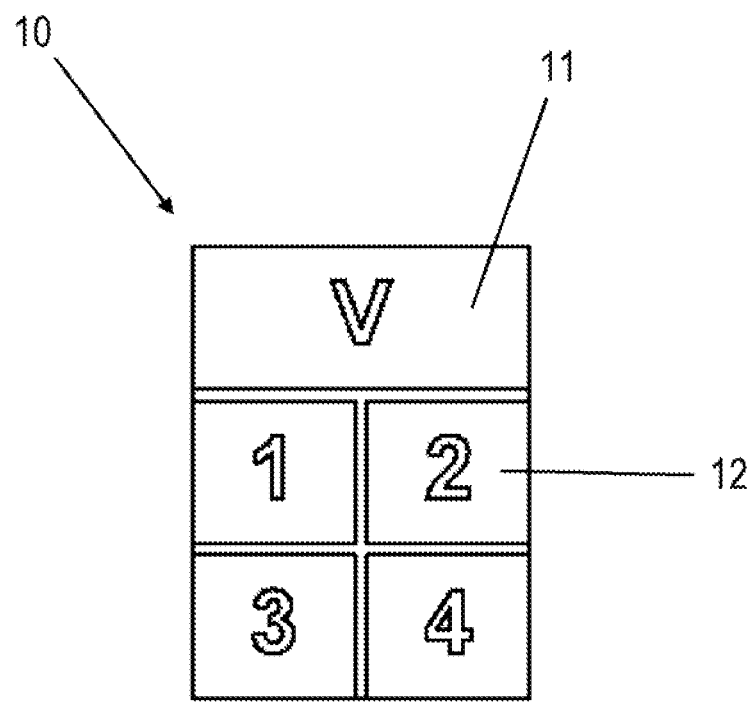
FIG. 3 shows a top view of a design example for a contact panel.

FIG. 3 shows an example of a contact panel 10, which in the illustrated design example has a base contact 11 and switchable contacts 12. The base contact 11 can be connected to the four switchable contacts 12 shown in any combination. The RFID chip can switch to an electrical voltage or earth (ground) via the base contact 11. By making contact with the contact panel, the RFID chip can now determine the combination of circuitry of the switchable contact panels and deduce the position in accordance with the disclosure.

Figure 4:
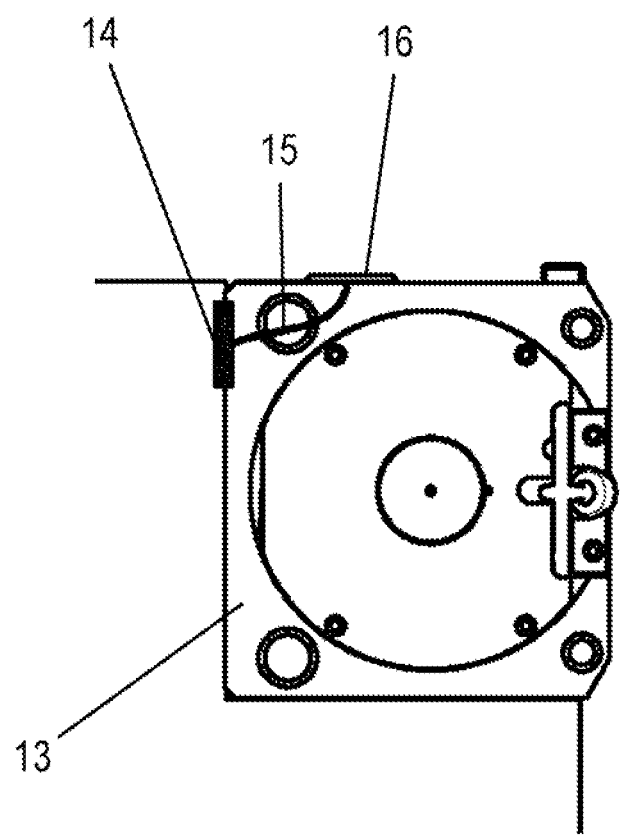
FIG. 4 shows a view of a tool holder with alternative wiring.
Figure 5:
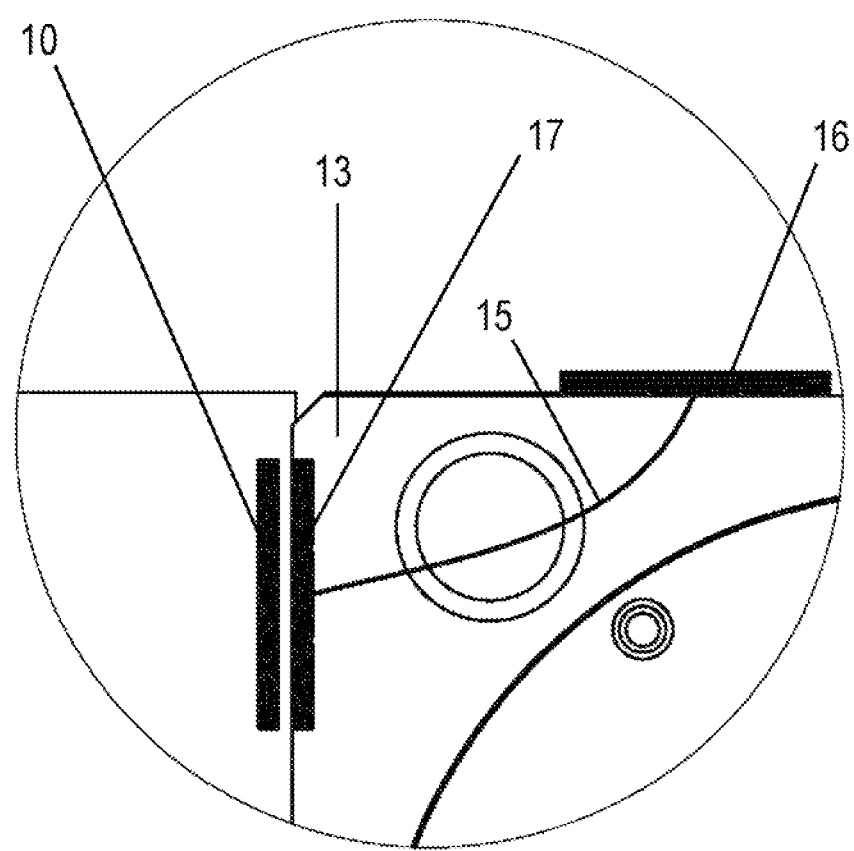
FIG. 5 shows an enlargement of area 5 according to FIG. 4.

FIG. 4 shows a special arrangement of an RFID chip on the ram. Shown is the ram 13, which is the same as ram 3. However, only two contact panels 10 and 17 are provided in contact area 14, which are in contact with each other. The contact panel 17 is in turn connected to the RFID chip 16 via a wire 15. This design can be applied anywhere in the contact areas, in order, for example, to be able to select a safe placement for the RFID chip.

The described design examples are for explanatory purposes and are not restrictive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A system for assigning tools mounted on rams to an installation position in a machine, comprising:
a RFID chip,
which is arranged on a ram,
which is writeable,
which has a transponder,
which has a memory,
which has passive digital inputs,
and
an electrically switchable contact panel,
with contacts,
which is arranged on a tool holder of the machine,
wherein the contacts of the contact panel can be contacted to the digital inputs of the RFID chip, and
the RFID chip transmits at least one identifier and the assignment of the digital inputs during a query process.

2. The system according to claim 1, wherein the digital inputs are contacted directly at the contact panel of the machine if the ram is mounted as intended.

3. The system according to claim 1, wherein the contact panel arranged at the connection position of the machine shows four contacts, each of which can be contacted with a digital input of the RFID chip.

4. The system according to claim 1, wherein the RFID chip includes information on the tool.

5. The system according to claim 1, wherein this is realised in a deep rolling machine.

6. The system according to claim 5, wherein the ram is designed as tool heads, i.e. as a deep rolling head and as a support roller head of the deep rolling machine.

7. A method for operating a system for assigning tools mounted on rams to an installation position in a machine, comprising:
arranging a ram having an RFID chip which is writeable with information on the tool, and which has a transponder and a memory,
wherein
passive digital inputs of the RFID chip make contact with a contact panel on the machine which is located at a connection position of the machine, whereby at least one identifier and the assignment of the digital inputs are transmitted by the RFID chip during a query process.

8. The method according to claim 7, wherein RFID chips are arranged in a deep rolling head as well as in a support roller head of a deep rolling machine and that the machine has contact panels at all connection points.

9. The method according to claim 7, wherein the installation position of a tool head is inferred from the information transmitted by the RFID chip about the wiring of the inputs of the RFID chip.

10. The method according to claim 7, wherein the tool is inferred from the information transmitted by the RFID chip about its description.

11. The method according to claim 7, wherein the information transmitted by the RFID chips is evaluated for component monitoring.

* * * * *